US012404865B2

(12) United States Patent
Mason et al.

(10) Patent No.: US 12,404,865 B2
(45) Date of Patent: Sep. 2, 2025

(54) CEILING FAN MOUNTING KIT

(71) Applicant: Hunter Fan Company, Memphis, TN (US)

(72) Inventors: Douglas Troy Mason, Horn Lake, MS (US); Matthew McPherson, Memphis, TN (US)

(73) Assignee: Hunter Fan Company, Memphis, TN (US)

( * ) Notice: Subject to any disclaimer, the term of this patent is extended or adjusted under 35 U.S.C. 154(b) by 0 days.

(21) Appl. No.: 18/659,700

(22) Filed: May 9, 2024

(65) Prior Publication Data

US 2025/0188943 A1 Jun. 12, 2025

Related U.S. Application Data

(60) Provisional application No. 63/606,759, filed on Dec. 6, 2023.

(51) Int. Cl.

| | |
|---|---|
| ***F04D 25/06*** | (2006.01) |
| ***F04D 25/08*** | (2006.01) |
| ***F04D 29/60*** | (2006.01) |
| ***F04D 29/64*** | (2006.01) |
| ***F21V 33/00*** | (2006.01) |

(52) U.S. Cl.

CPC ......... *F04D 25/0693* (2013.01); *F04D 25/06* (2013.01); *F04D 25/088* (2013.01); *F04D 29/601* (2013.01); *F04D 29/646* (2013.01); *F21V 33/0096* (2013.01)

(58) Field of Classification Search

CPC .... F04D 19/002; F04D 25/06; F04D 25/0693; F04D 25/088; F04D 29/34; F04D 29/329; F04D 29/601; F21V 21/03; F21V 33/0096; F24F 13/32; H02G 3/20

See application file for complete search history.

(56) References Cited

U.S. PATENT DOCUMENTS

| | | | | |
|---|---|---|---|---|
| 5,507,619 | A * | 4/1996 | Ryan | F04D 25/088 416/244 R |
| 6,956,493 | B1 | 10/2005 | Youngblood | |
| 9,394,919 | B1 * | 7/2016 | Byrne | F04D 25/0693 |
| 11,174,987 | B2 | 11/2021 | LeBlanc | |
| 2004/0005218 | A1 * | 1/2004 | Marshall | F04D 25/088 248/317 |

OTHER PUBLICATIONS

Enkistar, Universal Floodlight Camera Mount, https://www.enkistar.com/?fbclid=PAAaalWQ4swjR5UiFMKMNgQIRR_w0QT8_ZfD2DIQu6OmypC_3uMYKIDs6S0dE_aem_Afl4xFyMGOG-65Nm88fA%E2%80%A6, accessed Dec. 5, 2023, 7 pages.

* cited by examiner

*Primary Examiner* — Loren C Edwards
(74) *Attorney, Agent, or Firm* — McGarry Bair PC

(57) ABSTRACT

A ceiling fan or similar air-moving device can include a motor for rotating one or more blades to drive a volume of air about a space. A mounting kit can be used to secure the ceiling fan to a structure. The mounting kit can be corded instead of hard-wired to the structure electrical supply, which provides the user with the freedom to mount the ceiling fan at any desired location, without being limited to an electrical junction box location.

21 Claims, 7 Drawing Sheets

14

CEILING FAN MOUNTING KIT

CROSS-REFERENCE TO RELATED APPLICATIONS

This application claims benefit of U.S. Provisional Patent Application No. 63/606,759, filed Dec. 6, 2023. This application is also related to U.S. patent application Ser. No. 29,925,499, filed Jan. 24, 2024, and U.S. patent application Ser. No. 29/933,830, filed Mar. 21, 2024, all of which are hereby incorporated herein by reference in their entirety.

FIELD OF THE INVENTION

This application is directed to a ceiling fan, and more specifically, to a kit for mounting a ceiling fan to a structure without a hard-wired electrical connection.

BACKGROUND

Ceiling fans are machines traditionally suspended from a structure for moving a volume of air about an area. The ceiling fan includes a motor, with a rotor and a stator, suspended from and electrically coupled to the structure. A set of blades mount to the rotor such that the blades are rotatably driven by the rotor and can be provided at an angled orientation to move volume of air about the area.

The ceiling fan is secured to the structure by a bracket, which is often referred to as a ceiling plate or mounting bracket, which has a pass-through opening through which passes the electrical leads of one or both of the structure electrical supply or the fan. The electrical leads from the structure and fan can then be hard wired together using traditional wire nuts.

BRIEF DESCRIPTION

In one aspect, the disclosure relates to a ceiling fan mounting kit for a non-hard-wired electrical connection, the kit comprising: a mounting bracket having fastener openings through which fasteners can pass to secure the mounting bracket to a structure; a strain relief for an electrical cord; and an electrical cord having a plug on one end.

In another aspect, the disclosure relates to A ceiling fan mounting kit for a non-hard-wired electrical connection, the kit comprising: a mounting bracket having fastener openings through which fasteners can pass to secure the mounting bracket to a structure; an electrical cord having a plug on one end and a set of wire leads on another end; a strain relief securing the electrical cord to the mounting bracket; and a wire connector carried by the mounting bracket and receiving the set of wire leads from the electrical cord.

In yet another aspect, the disclosure relates to a ceiling fan mounting assembly for securing a ceiling fan to a structure, the ceiling fan mounting assembly comprising: a mounting bracket having a base and a peripheral wall, with the base having fastener openings through which fasteners can pass to secure the mounting bracket to the structure, the peripheral wall having a cord notch; a wire connector carried by the base; an electrical cord having a plug on one end and a set of wire leads on another end, wherein the cord passes through the cord notch and the wire leads are received in the wire connector; and a strain relief carried by the base and securing the electrical cord to the mounting bracket.

DETAILED DESCRIPTION

Figure 1:
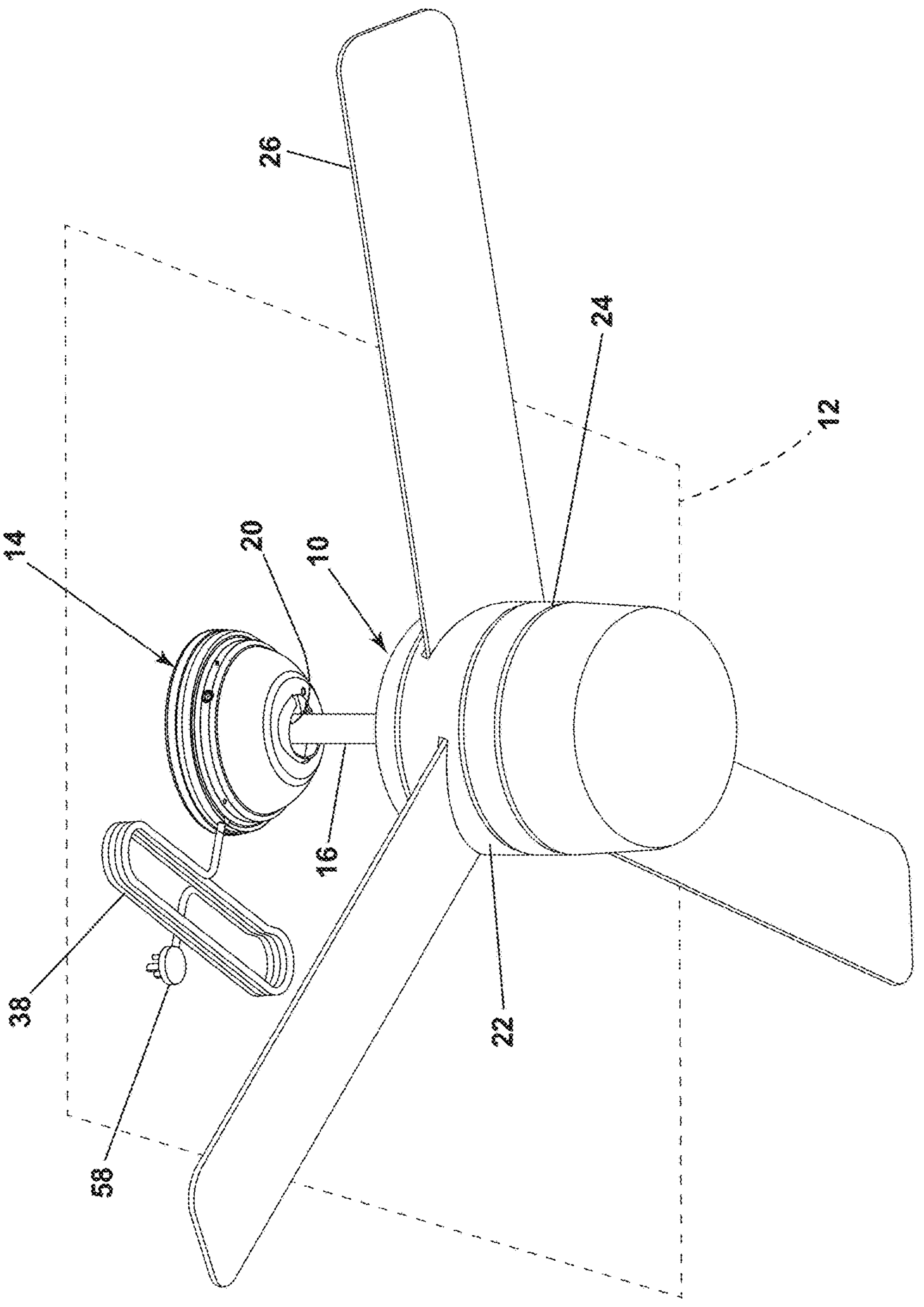
FIG. 1 is a perspective view of a structure with a ceiling fan and a mounting kit securing the ceiling fan to the structure.

The disclosure is related to a ceiling fan and mounting kit, which can be used, for example, in residential and commercial applications. Such applications can be indoors, outdoors, or both. While this description is primarily directed toward a residential ceiling fan, it is also applicable to any environment utilizing fans or for cooling areas utilizing air movement.

As used herein, the term "set" or a "set" of elements can be any number of elements, including only one. All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

Referring now to FIG. 1, a ceiling fan 10 is suspended from a structure 12 by a mounting kit 14. In non-limiting examples, the ceiling fan 10 can include one or more ceiling fan components including a downrod 16, a hanger ball 20, a motor housing 22 at least partially encasing a motor (not shown) having a rotor and a stator, a light kit 24, and a set of blades 26, which can have optional blade irons (not shown), depending on the ceiling fan configuration. In additional non-limiting examples, the ceiling fan 10 can include one or more of a controller, a wireless receiver, a light glass, a light cage, a spindle, a finial, a switch housing, blade forks, blade tips or blade caps, or other ceiling fan components.

The structure 12 can be a ceiling, for example, from which the ceiling fan 10 is suspended. It should be understood that the structure 12 is schematically shown and is by way of example only, and can include any suitable building, structure, home, business, or other environment wherein moving air with a ceiling fan is suitable or desirable.

While not shown in the drawings, a controller can be electrically coupled to the electrical supply to control operation of the ceiling fan 10. Alternatively, the controller can be wirelessly or communicatively coupled to the ceiling fan 10, configured to control operation of the ceiling fan 10 remotely, without a dedicated connection. Non-limiting examples of controls for the ceiling fan 10 can include fan speed, fan direction, or light operation. Furthermore, a separate wireless controller, alone or in addition to the wired controller, can be communicatively coupled to a controller or a wireless receiver in the ceiling fan 10 to control operation of the ceiling fan 10. It is further contemplated in one alternative example that the ceiling fan 10 be operated by the wireless controller alone and is not operably coupled with the wired controller.

Figure 2:
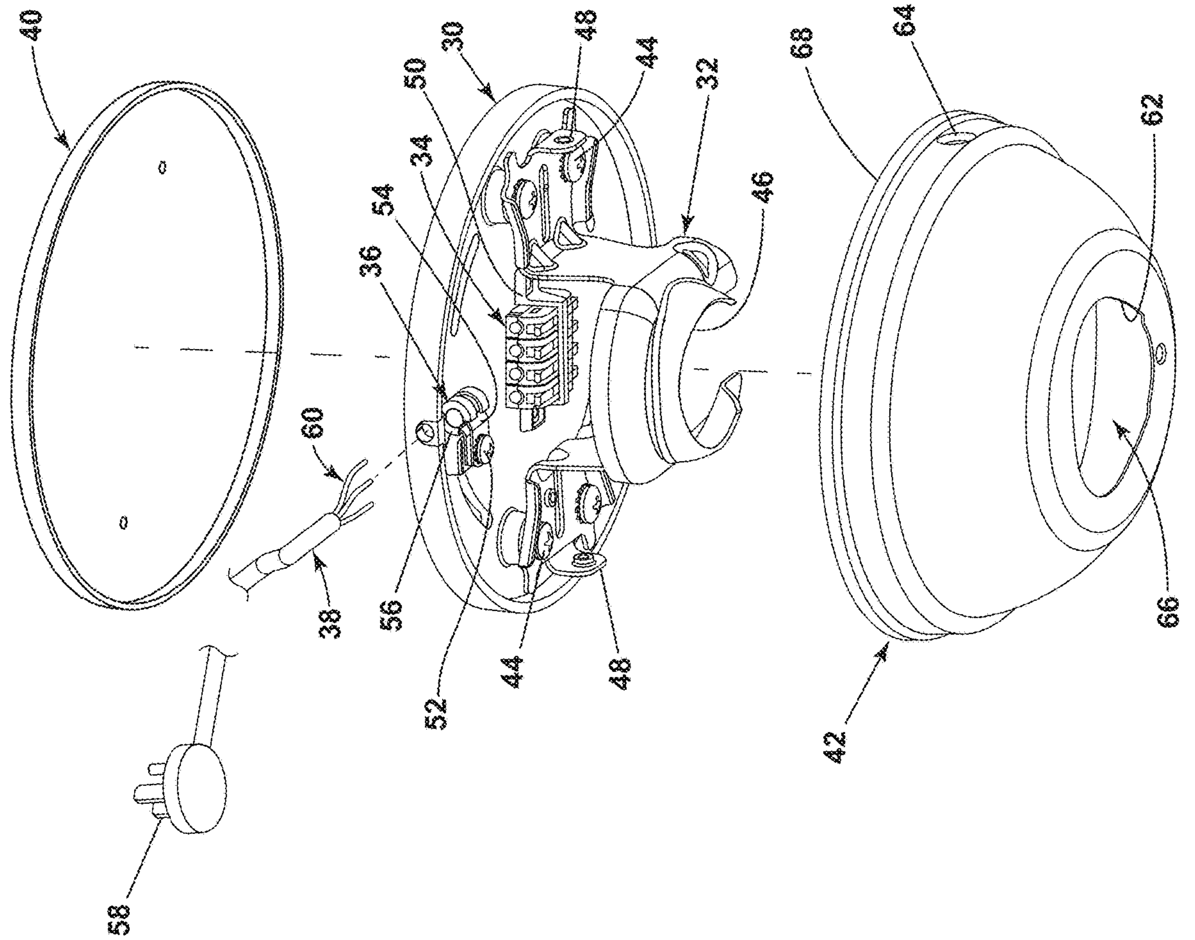
FIG. 2 is a partial exploded view of the mounting kit of FIG. 1.

Referring to FIG. 2, the mounting kit 14 is illustrated partially exploded to illustrate the different components of the mounting kit 14, which are illustrated as including: mounting bracket 30, hanger bracket 32, wire connector 34, strain relief 36, cord 38, gasket 40, and canopy 42. For case of description, the canopy 42 is described as part of the mounting kit 14. However, the canopy 42 can be considered as part of the ceiling fan 10 and is optional to the mounting kit 14.

The mounting bracket 30 is secured to the structure 12, such as by suitable fasteners (screws, bolts, etc) that are secured directly to the structure 12 or the framing in a wood-frame structure. Additionally, suitable anchors (drywall, concrete, etc.) can be affixed to the structure 12 and the mounting bracket 30 is secured to the anchors. Other methods of securing the mounting bracket 30 to the structure 12 are contemplated, and the particular method is not limiting. The mounting bracket 30 forms the primary physical connection between the structure 12 and the ceiling fan 10. As illustrated, the mounting bracket 30 also forms the primary structure for carrying the other components of the mounting kit 14.

The hanger bracket 32 is secured to the mounting bracket 30, such as, for example, by the illustrated fasteners 44, and has a ball seat 46 for receiving the hanger ball 20 to secure the motor housing 22, via the downrod 16, to the structure 12. The hanger bracket 32 further has tabs with tab openings 48 for use in securing the canopy 42.

The wire connector 34 is secured to the mounting bracket 30, such as by the illustrated clamp 50, which can be secured to the mounting bracket 30 by suitable fasteners, such as bolts or screws, for example. The wire connector 34 has a first set of wire lead receptacles that receive wire leads from the cord 38 and at least a second set of wire lead receptacles that receive wire leads from one or both of the motor or controller. Internally of the wire connector 34 the first and second sets of the wire lead receptacles are electrically connected. In this way, the wire connector 34 forms a common junction for the household power supply and the elements of the ceiling fan 10 requiring power.

The strain relief 36 is secured to the mounting bracket 30, such as, for example, by the illustrated fastener 52, and comprises a clamp band 54, which upon the tightening of the fastener 52 tightens the clamp band 54. A band of compressible material 56 can be carried by the interior of the clamp band 54 and provide a slightly compliant and non-sharp interface with the cord 38. The compressible material 56 can also form a liquid seal.

The cord 38 terminates on one end in a plug 58 and the other end in a set of wire leads 60, which are received within the first set of receptacles for the wire connector 34 after the cord 38 is passed through the clamp band 54 of the strain relief 36. The cord 38 is secured to the mounting bracket 30 by the clamp 50 band, which tightens around the cord 38 as well as the frictional holding of the wire connector 34.

The canopy 42 is a decorative cover that visually hides most of the mounting kit components carried by the mounting bracket 30. The canopy 42 has an opening 62 through which the hanger ball 20 and downrod 16 can pass as well as fastener openings 64. Suitable fasteners (not illustrated), such as screws or bolts, can pass through the fastener openings 64 and into the tab openings 48 of the hanger bracket 32 to secure the canopy 42 to the hanger bracket 32. The canopy 42 also defines an interior volume 66 accessible through an open upper end 68, whereby the canopy 42 can be pushed up toward the mounting bracket 30 such that the components of the mounting kit 14 carried by the mounting bracket 30 are received within the interior volume 66.

Figure 3:
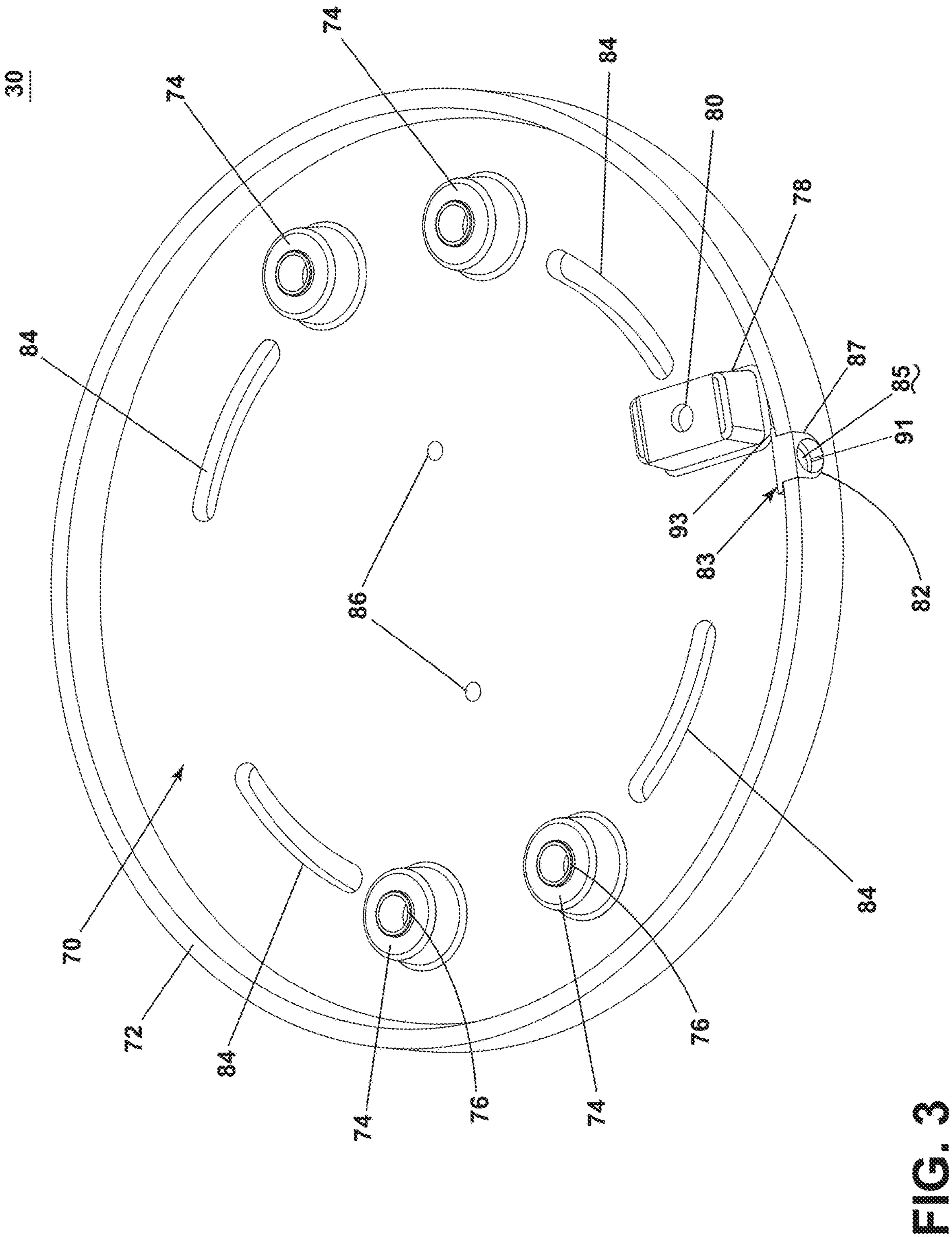
FIG. 3 is a bottom view of a mounting bracket from the mounting kit of FIG. 2.

Referring to FIG. 3, the mounting bracket 30 is shown in greater detail and with the removal of all the other components from the mounting kit 14. The mounting bracket 30 comprises a base 70, with an optional peripheral wall 72, which bounds an interior of the base 70. Various embossments are formed in the base to case the mounting of the different mounting kit components. For example, hanger bracket embossments 74 are provided and have openings 76 that receive fasteners, such as screws or bolts, for securing the hanger bracket 32 to the base 70. A strain relief embossment 78 has an opening 80 that also receives the fastener. A cord notch 82 is formed in the peripheral wall 72 adjacent the strain relief embossment 78 and provides an open area in the peripheral wall 72 through which the cord 38 can pass. The location of the cord notch 82 is axially aligned with the location of the clamp 50 band to case the passing of the cord 38.

A cord gasket 83 is received within the cord notch 82 and has an opening 85 through which the cord 38 passes. The cord gasket 83 forms a liquid seal around the chord 38 and between the cord 38 and the peripheral wall 72, and, optionally, the base 70. The cord gasket 83 can have a ring 87 forming the opening 85, with the ring 87 received within the cord notch 82. The ring 87 can have a split 91 to case the insertion of the cord 38 through the opening 85. A backwall 93 bears against an inner surface of the peripheral wall 72 while supporting the ring 87. The backwall 93 functions as a stop to limit the insertion of the ring 87 into the cord notch 82 as well as retard the removal of the cord gasket 83 through the cord notch 82.

Various openings are formed in the base 70 to aid in the securing of the mounting bracket 30 to the structure. As illustrated, there are multiple slots 84, which provide openings through which fasteners, such as screws or bolts, can pass through and be affixed into the structure. The multiple slots could be a single slot, instead of the multiple discrete slots. The slots, while illustrated as being arcuate, could take on different shapes, such as linear. Other openings 86 are provided for mounting the wire connector 34 by suitable fasteners.

Notably, the base 70 does not have an opening for the passage of electrical wire leads from the householder power supply, unlike prior mounting brackets. Prior mounting brackets were designed to be located at an electrical junction box, typically in the ceiling. The prior mounting bracket would be secured directly to the junction box and the wire leads from the household power supply would pass from the junction box through the large central opening of the mounting bracket 30. Such a configuration is not needed with the described mounting bracket 30 since the cord 38 is used, instead of the hard-wired, wire leads from the household power supply, to connect to the household power supply. The use of the cord 38 in place of the hard-wired, household wire leads frees the mounting kit 14 from being located where an electrical junction box is located. This freedom provides the consumer with the benefit of locating the mounting kit 14 anywhere they like on the structure and not just where a junction box is located. Previously, consumers would be forced to place the ceiling fan 10 where a junction box was present or have an electrician install a new junction box, at substantial cost, where it was desired to place the ceiling fan 10. With the corded mounting kit 14, the consumer is free to place the ceiling fan 10 anywhere they like, without consideration of the prewired junction box. Such freedom is beneficial for both indoor and outdoor ceiling fan 10 mountings, but especially for outdoor mountings where junction boxes are typically not present, but an outdoor electrical outlet, which can receive the plug end of the cord 38 is present.

Figure 4:
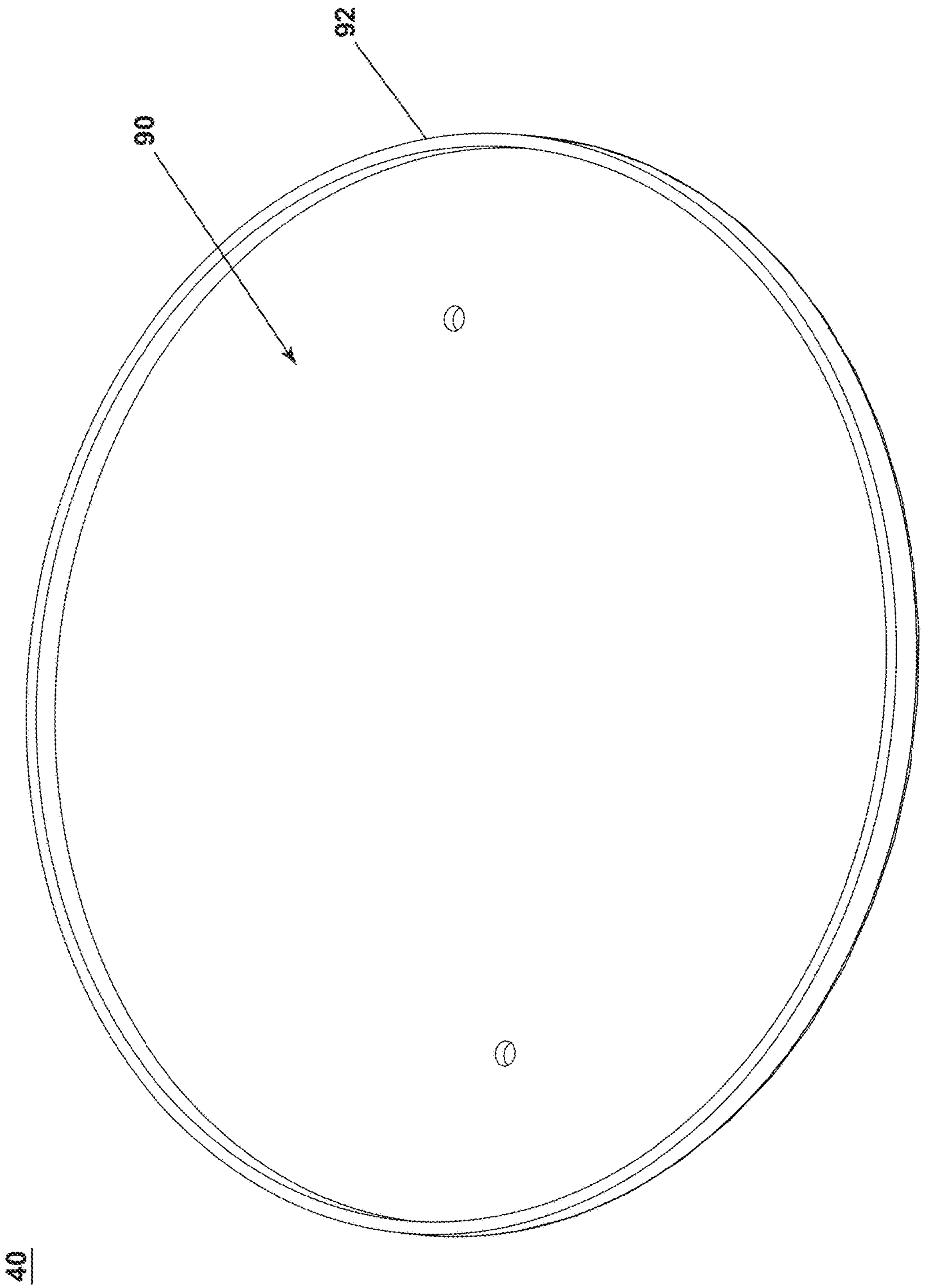
FIG. 4 is a bottom view of a gasket from the mounting kit of FIG. 2.

FIG. 4 illustrates the gasket 40, which is optional for the mounting kit. The gasket 40 is primarily intended to prevent water from entering the openings in the base of the mounting bracket 30. As such, the gasket 40 is primarily intended for use in outdoor installations. However, there is no reason why the gasket 40 cannot be used in indoor installations. The gasket 40 has a gasket base 90 and gasket peripheral wall 92, similar to the similar structures of the mounting bracket 30. Advantageously, the gasket base 90 and gasket peripheral wall 92 of the gasket 40 can be complementary with those of the mounting bracket 30 such that they form a water seal therewith. The gasket base 90 and gasket peripheral wall 92 define a gasket recess 94 that is sized to receive the mounting bracket 30 such that the gasket base 90 abuts the base 70 and the gasket peripheral wall 92 abuts the peripheral wall 72. The gasket peripheral wall 92 is illustrated as being shorter than the peripheral wall 72, but that need not be the case. The gasket peripheral wall 92 improves the water sealing function by wrapping around the mounting bracket 30 to prevent water from easily entering the interface between the gasket 40 and the mounting bracket 30.

Figure 5:
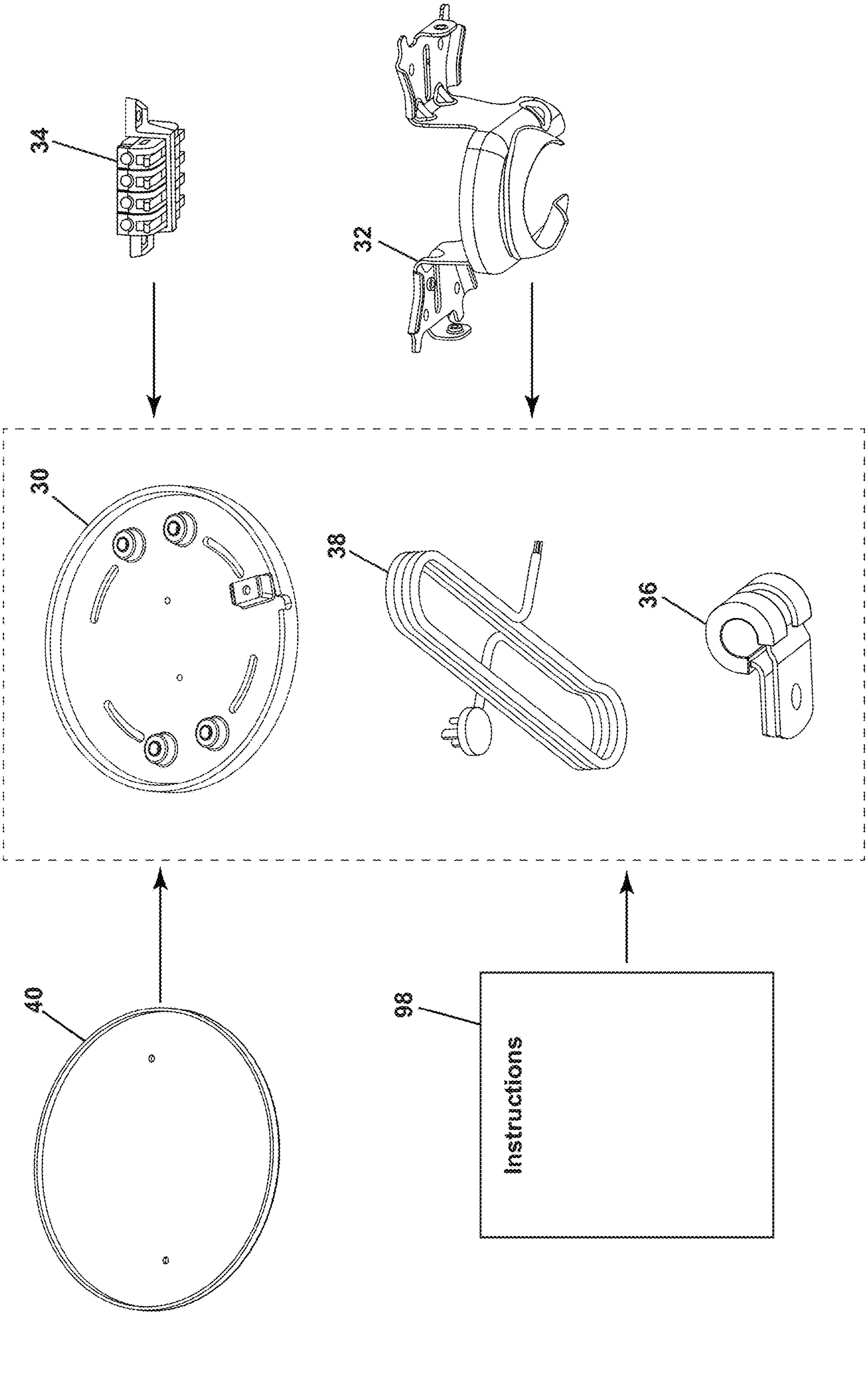
FIG. 5 is a view of a kit with options for the mounting kit of FIG. 2.

FIG. 5 illustrates the various contemplated commercially available kits for the mounting kit. In the simplest, most bare bones form, the mounting kit would be commercially sold in a kit 100 that includes just the mounting bracket 30, cord 38, and strain relief 36, which will be referenced herein as the "base kit". With such a kit, it would be contemplated that the consumer would use an already existing hanger bracket 32 and canopy 42 from the ceiling fan 10. It is further contemplated that the consumer would hard wire the cord 38 wire leads to the motor electrical leads using tradition wire nuts.

In a first variation of the base kit, the gasket 40 can be added, especially when an outdoor installation is contemplated. In a second variation, the wire connector 34 can be included with the base kit and/or with the first variation. In a third variation, the hanger bracket 32 can be included with the base kit, first variation, or third variation. In many cases, the consumer could use the hanger bracket 32 from the ceiling fan 10. However, many consumers may not want to disassembly the hanger bracket 32 from the ceiling fan 10 and assemble it to the mounting bracket 30, and/or the prior hanger bracket 32 may not be compatible with the mounting bracket 30. Therefore, it will be more convenient for many consumers to provide the hanger bracket 32 with the commercially available kit, especially pre-assembled to the mounting bracket 30.

In all of the different commercially available kits, the different components of the mounting kit can be unassembled, pre-assembled, or a portion of them pre-assembled. The greater the degree of pre-assembly, the easier it will be on the consumer.

Referring still to FIG. 5, all of the kits can include ceiling fan-specific instructions 98 to guide the installer, who is contemplated to be a consumer of the fan, through one or more of the following exemplary installation steps of: locating the mounting bracket 30 relative to the structure 12, securing the mounting bracket 30 to the structure, securing the cord to the strain relief 36, connecting the wire leads 60 to the wire connector 34, securing the hanger ball 20 to the hanger ball seat 46, and affixing canopy 42 to the hanger bracket 32. Depending on the variation of the kit, the instructions 98 may include securing the hanger bracket 32 to the mounting bracket 30 or securing the wire connector 34 to the mounting bracket 30. The instructions 98 can also include guiding the installer on a suitable electrical outlet in which the plug 58. The instructions 98 can be a separate printed sheet or booklet, which is included with the packaging of the kit. The instructions 98 can also be printed on the packaging. For example, the packaging can include a box containing the kit and the printed sheet or booklet can be provided in the box or printed on a surface of the box. In some cases, the packaging can be a cardboard backing with a plastic wrap or blister pack, with the components of the kit located between the cardboard backing and the plastic wrap. The printed sheet or booklet can be sandwiched between the cardboard backing and plastic sheet as well or the instructions can be printed on the cardboard backing.

While it is contemplated the consumer will use the canopy 42 that comes with the ceiling fan 10, another variation to all of the previously described mounting kits, is the additional of a canopy 42.

Figure 6:
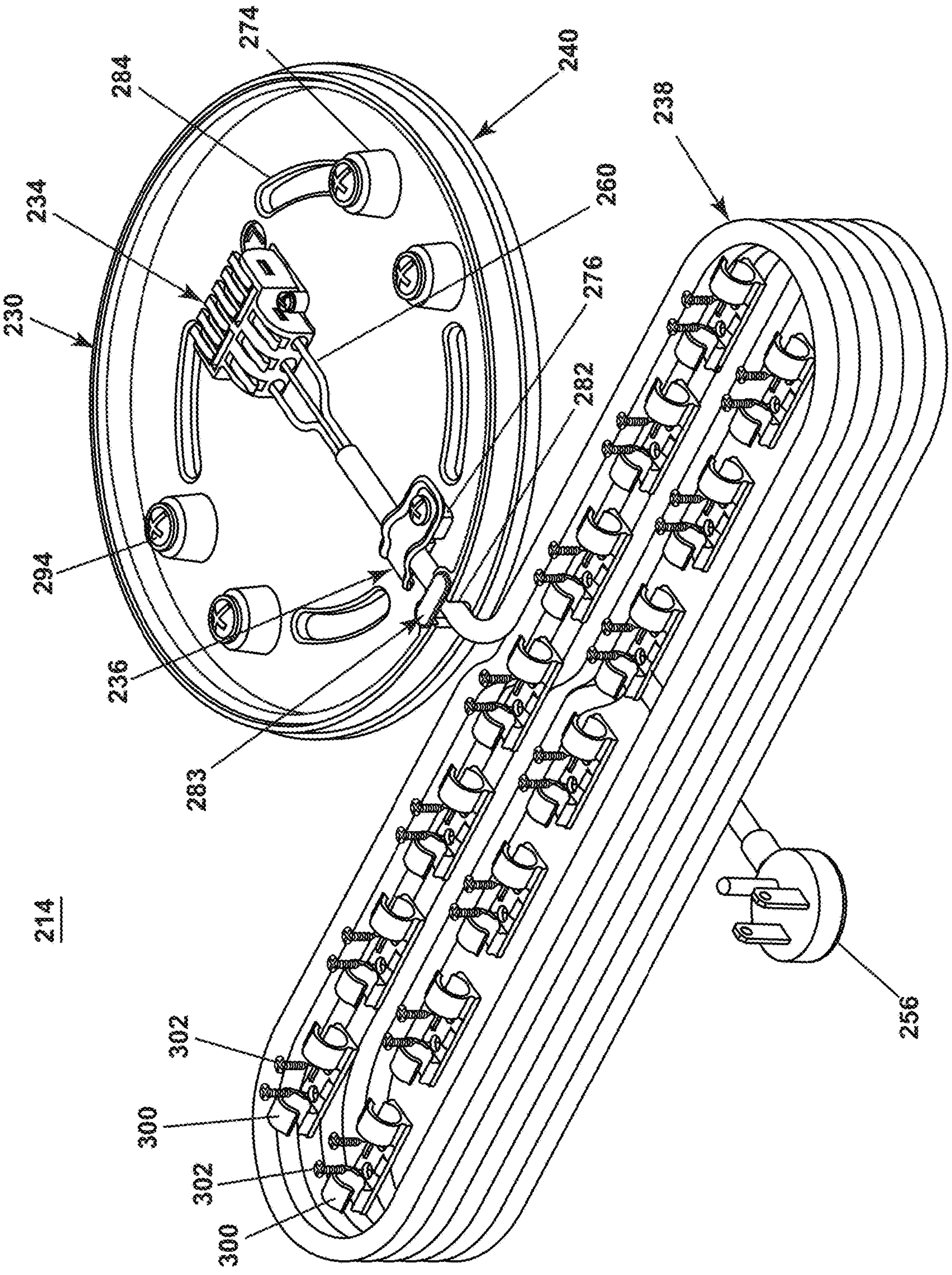
FIG. 6 is a perspective view of a second embodiment of the mounting kit.

Referring to FIG. 6, a second embodiment mounting kit 214 is illustrated. The mounting kit 214 is similar to the mounting kit 14. Therefore, like parts will be identified with like numerals increased by 200. Also, the prior description for mounting kit 14 is applicable to mounting kit 214, including all of the variants. Therefore, the following description of the mounting kit 214 will highlight the differences with respect to mounting kit 14.

The mounting kit 214 is illustrated as including: mounting bracket 230, wire connector 234, strain relief 236, cord 238, and gasket 240. The mounting kit 214 is illustrated without a canopy or a hanger bracket to simplify the description. The canopy 42 and the hanger bracket 32 can be used with the mounting kit 214 and their prior description is applicable to the mounting kit 214. The canopy and hanger bracket are also optional for the mounting kit 214.

The mounting kit 214 further includes cord clips 300 and corresponding fasteners 302. While fourteen cord clips 300 are shown, and the corresponding number of fasteners 302, any desired number can be provided. While the chord clips 300 are not shown with the mounting kit 14, they can be used with the mounting kit 14. Any suitable cord clips 300 and any fasteners 302 can be used. The cord clips 300 are secured to the structure 12 and help hold the cord 238 in place against the structure 12. The fasteners 302 are illustrated as screws. However, they could also include an anchor, such as a drywall anchor or concrete anchor, for example, in which the screw is received. Depending on the structure 12, the cord clips 300 could be attached by an adhesive instead of a fastener.

The mounting kit 214 further includes a cord gasket 283 that forms a liquid seal between the cord 238 and a cord notch 282 in the mounting bracket 230. The strain relief 236 is different from the strain relief 36 in that it is structurally different and it is inset further interiorly of the cord notch 282.

Figure 7:
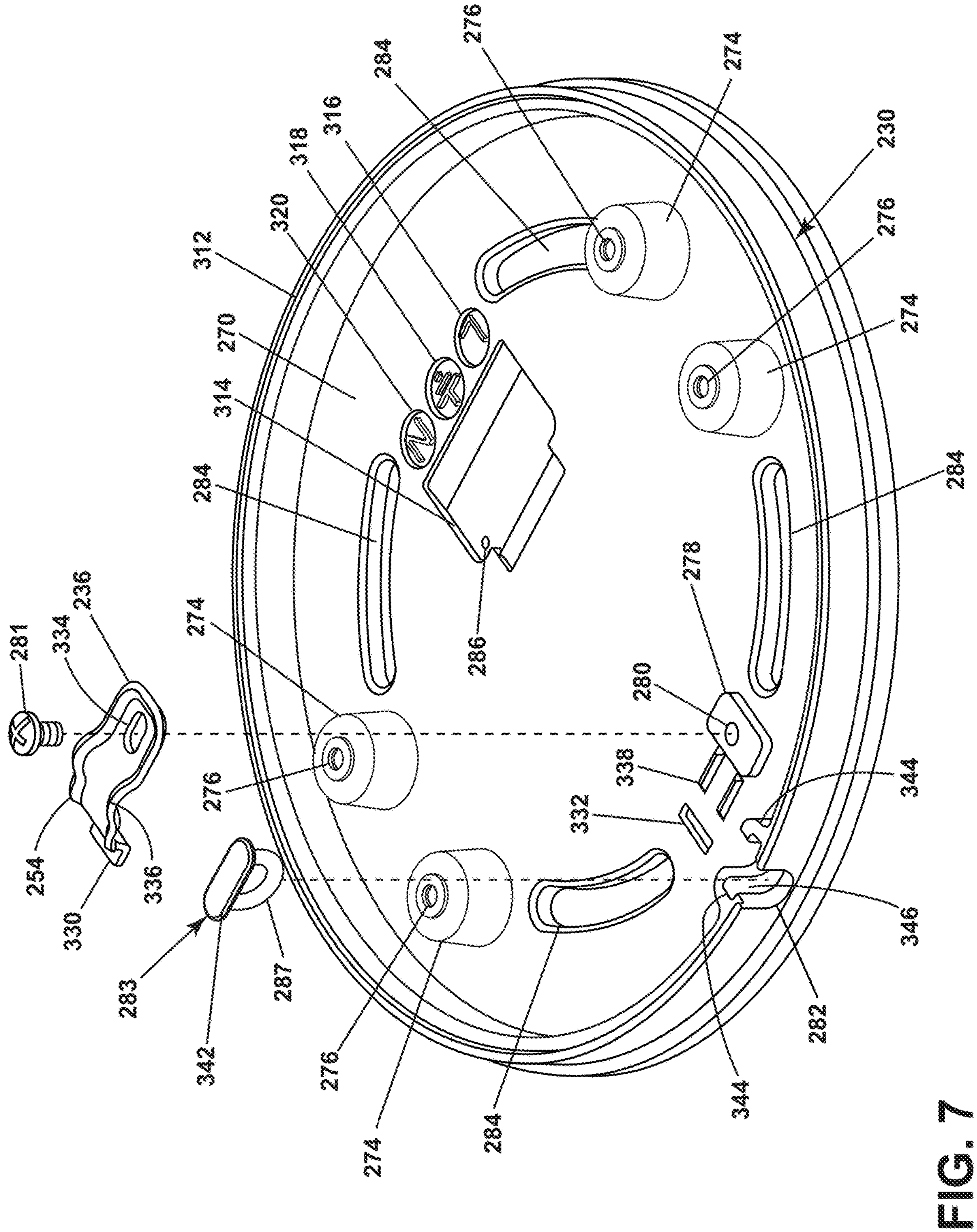
FIG. 7 is an exploded view of the mounting bracket for the mounting kit of FIG. 6.

The mounting bracket 230, strain relief 236, and cord gasket 283 are better seen in FIG. 7, which shows the strain relief 236 and cord gasket 283 partially exploded from the mounting bracket 230. As with the mounting bracket 30, the mounting bracket 230 comprises a base 270, with an optional peripheral wall 272, which bounds an interior of the base 70. The peripheral wall 272 includes a drip edge 312. The drip edge 312 causes liquid running down the exterior of the peripheral wall 272 to drip off the mounting bracket 230 instead of the following the contour of the peripheral wall 272 into the interior of the mounting bracket 230. The drip edge 312 can be added to the mounting bracket 30. During operation, it should be noted that the mounting bracket 230 will be oriented 180 degrees (face down) from what is seen in FIG. 7 (face up). In the operative orientation, liquid will flow along the outside of the peripheral wall 272 and down to the lowest extent of the drip edge 312, where the liquid will not be able to turn the corner formed by the drip edge 312, and the liquid will drip off the drip edge 312.

Various embossments are formed in the base 270 to case the mounting of the different mounting kit components. For example, hanger bracket embossments 274 are provided and have openings 276 that receive fasteners, such as screws or bolts, for securing the hanger bracket 32 to the base 270. A strain relief embossment 278 has an opening 280 that also receives the fastener 281. The cord notch 282 is formed in the peripheral wall 272 and provides an open area in the peripheral wall 272 through which the cord 238 can pass.

Various openings are formed in the base 270 to aid in the securing of the mounting bracket 230 to the structure 12. As illustrated, there are multiple slots 284, which provide openings through which fasteners, such as screws or bolts, can pass through and be affixed into the structure 12. The multiple slots could be a single slot, instead of the multiple discrete slots. The slots, while illustrated as being arcuate, could take on different shapes, such as linear. Other openings 286 are provided for mounting the wire connector 234 by suitable fasteners.

The base 270 also includes a recess 314 sized to receive the wire connector 234. The recess 314 is shaped to complement and index the wire connector 234 and, therefore, simplifies the locating and alignment of the wire connector 234 to the base 270. The base 270 further includes indicia associated with the wire connector 234. The indica indicates the orientation and wiring of the wire connector 234 in terms of the three household wire leads: Live 316, Ground 318, and Neutral 320. The indica helps an installer when the household wiring has a different color sheath than is currently found in the industry. As with the base 70, the base 270 does not have an opening for the passage of electrical wire leads from the householder power supply for the same purposes as the base 70.

The strain relief 236 comprises a clamp band 254 having one end, with a tab 330, that is received in a clamp band recess 332 in the base 270 and another end that has a fastener opening 334 that overlies the opening 280 in the strain relief embossment 274, which upon the receipt of the fastener 252 in the aligned openings 334, 280, the clamp band 254 us secured to the strain relief embossment 274. The clamp band 254 includes an arcuate portion 336 that conforms to the contour of the cord 238.

One or more teeth 338 protrude from the base 270 and underlie the clamp band 254, especially the arcuate portion 336, such that the cord 238 is pressed into the teeth 338 as the clamp band 254 is tightened. The teeth 338 help hold the cord 238 in place.

The cord gasket 283 comprises a ring 287 depending from a tab 342. The peripheral wall 272 includes a pair or fingers 344 on opposite sides of the cord notch 282. A ring slot 346 is formed in the fingers 344, and the base 270, to receive and hold the ring 287. The tab 342 forms a seal across the terminal ends of the fingers 344. The tab 342 also functions to continue the drip edge across the cord notch 282.

The second embodiment mounting kit 214 can be arranged in a kit in the same manner as the first embodiment, with or without, the additional kit variations described for the second embodiment. Similarly, the first embodiment can be arranged in a kit according to the variations for the second embodiment. For example, while the first embodiment is not shown with the cord clips of the second embodiment, the cord clips can be added to the first embodiment. Further, the seal edge and/or the cord gasket of the second embodiment can be used with the first embodiment. Similarly, either of the embodiments can use the strain relief from the other embodiment. These examples are not meant to be limiting on the combination of variations from one embodiment to the other embodiment. Instead, these examples are just that, possible examples, to understand what is meant by adding a variation of one embodiment to the other and how the variations can be mixed and matched between the disclosed embodiments in making a kit.

Also, in making the kits, multiple and/or duplicate parts can be included, and the parts can cross embodiments. For example, both strain reliefs can be placed in the same kit. Alternatively, multiple of the same strain relief can be placed in the same kit. This use of multiple/duplicate parts applies to all of the parts for both embodiments.

Throughout the disclosure, suitable fasteners are described for securing different components. Such fastener can be any type of fastener. In many cases the suitable fastener is a screw or a bolt. If a bolt, then the opening that the bolt is threaded into will be a tapped opening having complementary threads for receipt of the bolt. The fasteners may be used alone or in combination with a suitable anchor, especially when the fastener attaches to the structure. Suitable anchors can be material dependent, such as drywall anchors or concrete anchors.

To the extent not already described, the different features and structures of the various features can be used in combination as desired. That one feature is not illustrated in all of the aspects of the disclosure is not meant to be construed that it cannot be but is done for brevity of description. Thus, the various features of the different aspects described herein can be mixed and matched as desired to form new features or aspects thereof, whether or not the new aspects or features are expressly described. All combinations or permutations of features described herein are covered by this disclosure.

Both of the strain reliefs described and illustrated are advantageous in that they permit the installer to remove, such as by cutting, any excess cord, strip the end of the wires, and connect the stripped end to the wire connector. The strain relief can then be tightened on the shortened cord. In this way, the strain relief aids the installer in removing any excess cord to provide a more custom installation.

This written description uses examples to detail the aspects described herein, including the best mode, and to enable any person skilled in the art to practice the aspects described herein, including making and using any devices or systems and performing any incorporated methods. The patentable scope of the aspects described herein are defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects are provided by the subject matter of the following clauses:

A ceiling fan mounting kit for a non-hard-wired electrical connection, the kit comprising: a mounting bracket having fastener openings through which fasteners can pass to secure the mounting bracket to a structure; a strain relief for an electrical cord; and an electrical cord having a plug on one end.

The kit according to any of the other clauses further comprising a wire connector.

The kit according to any of the other clauses wherein the wire connector has a first set of wire lead receptacles for the cord and a second set of wire lead connectors for the ceiling fan.

The kit according to any of the other clauses wherein another end of the cord has wire leads for receipt within the first set of wire lead receptacles.

The kit according to any of the other clauses further comprising a hanger bracket having a hanger ball seat.

The kit according to any of the other clauses wherein the hanger bracket comprises canopy mounting tabs.

The kit according to any of the other clauses further comprising a canopy.

The kit according to any of the other clauses wherein the wire connector is carried by the mounting bracket.

The kit according to any of the other clauses wherein the cord strain relief is carried by the mounting bracket.

The kit according to any of the other clauses further comprising a hanger bracket.

The kit according to any of the other clauses further comprising a gasket for use between the mounting bracket and structure.

The kit according to any of the other clauses wherein the gasket comprises a recess for receipt of the mounting bracket.

A ceiling fan mounting kit for a non-hard-wired electrical connection, the kit comprising: a mounting bracket having fastener openings through which fasteners can pass to secure the mounting bracket to a structure; an electrical cord having a plug on one end and a set of wire leads on another end; a strain relief securing the electrical cord to the mounting bracket; and a wire connector carried by the mounting bracket and receiving the set of wire leads from the electrical cord.

The kit of any of the other clauses further comprising a gasket to seal the mounting bracket with the structure.

The kit of any of the other clauses wherein the gasket comprises a recess that receives at least a portion of the mounting bracket.

The kit of any of the other clauses wherein the gasket and mounting bracket have complementary planar surfaces.

The kit of any of the other clauses wherein the complementary planar surfaces have complementary fastener openings.

The kit of any of the other clauses wherein the gasket and mounting bracket have complementary peripheral walls.

The kit of any of the other clauses wherein the mounting bracket peripheral wall is radially interior of the gasket peripheral wall.

The kit of any of the other clauses wherein the complementary peripheral walls are in contact.

A ceiling fan mounting assembly for securing a ceiling fan to a structure, the ceiling fan mounting assembly comprising: a mounting bracket having a base and a peripheral wall, with the base having fastener openings through which fasteners can pass to secure the mounting bracket to the structure, the peripheral wall having a cord notch; a wire connector carried by the base; an electrical cord having a plug on one end and a set of wire leads on another end, wherein the cord passes through the cord notch and the wire leads are received in the wire connector; and a strain relief carried by the base and securing the electrical cord to the mounting bracket.

The ceiling fan mounting assembly of any of the other clauses wherein the peripheral wall further comprises a drip edge.

The ceiling fan mounting assembly of any of the other clauses wherein the drip edge extends continuously about the peripheral wall, except for the cord notch.

The ceiling fan mounting assembly of any of the other clauses further comprising a cord gasket providing a drip edge across the cord notch.

The ceiling fan mounting assembly of any of the other clauses wherein the cord gasket forms a liquid seal within the cord notch.

The ceiling fan mounting assembly of any of the other clauses wherein the liquid seal extends between the cord and the mounting bracket.

The ceiling fan mounting assembly of any of the other clauses wherein the cord gasket defines a cord opening through which the cord passes.

The ceiling fan mounting assembly of any of the other clauses wherein the cord gasket defines a ring forming the cord opening.

The ceiling fan mounting assembly of any of the other clauses wherein the cord gasket further comprises a tab abutting the peripheral wall and the ring depending from the tab.

The ceiling fan mounting assembly of any of the other clauses wherein the tab continues the drip edge across the cord notch.

The ceiling fan mounting assembly of any of the other clauses wherein the peripheral wall defines a ring slot that receives the ring.

The ceiling fan mounting assembly of any of the other clauses further comprising a cord gasket forming a liquid seal between the cord and the mounting bracket.

The ceiling fan mounting assembly of any of the other clauses wherein the cord gasket forms a liquid seal within the cord notch.

The ceiling fan mounting assembly of any of the other clauses wherein the cord gasket defines a cord opening through which the cord passes.

The ceiling fan mounting assembly of any of the other clauses wherein the cord gasket defines a ring forming the cord opening.

The ceiling fan mounting assembly of any of the other clauses wherein the peripheral wall defines a ring slot that receives the ring.

The ceiling fan mounting assembly of any of the other clauses wherein the peripheral wall has two spaced fingers in which at least a portion of the ring slot is formed.

The ceiling fan mounting assembly of any of the other clauses wherein the cord gasket further comprises a tab abutting the peripheral wall.

The ceiling fan mounting assembly of any of the other clauses wherein the tab spans the cord notch.

The ceiling fan mounting assembly of any of the other clauses wherein the tab forms a drip edge over the cord notch.

The ceiling fan mounting assembly of any of the other clauses wherein the strain relief further comprises a clamp band securing the cord to the mounting bracket.

The ceiling fan mounting assembly of any of the other clauses wherein the strain relief further comprises compressible material surrounding at least a portion of the cord.

The ceiling fan mounting assembly of any of the other clauses wherein the compressible material circumscribes at least a portion of the cord.

The ceiling fan mounting assembly of any of the other clauses wherein the clamp band wraps around the compressible material.

The ceiling fan mounting assembly of any of the other clauses wherein the strain relief further comprises at least one tooth extending from the mounting bracket and located below the clamp band.

The ceiling fan mounting assembly of any of the other clauses wherein the at least one tooth comprises multiple teeth.

The ceiling fan mounting assembly of any of the other clauses wherein the clamp band comprises a portion conforming to the shape of the cord.

The ceiling fan mounting assembly of any of the other clauses wherein the clamp band comprises a tab and the mounting bracket comprises a slot receiving the tab.

What is claimed is:

1. A ceiling fan mounting kit for a non-hard-wired electrical connection, the kit comprising:

a mounting bracket having fastener openings through which fasteners can pass to secure the mounting bracket to a structure;

a strain relief carried by the mounting bracket;

an electrical cord coupled to the strain relief and having a plug on one end and wire leads on another end; and a hanger bracket having a hanger ball seat;

wherein the mounting bracket further comprises a peripheral wall with a cord notch through which the electrical cord passes;

wherein the strain relief is aligned with the cord notch; and wherein the wire leads are located interior of the peripheral wall and the plug is exterior of the peripheral wall.

2. The kit according to claim 1, further comprising a wire connector.

3. The kit according to claim 2, wherein the wire connector has a first set of wire lead receptacles for the cord and a second set of wire lead connectors for a ceiling fan.

4. The kit according to claim 3, wherein the wire leads are for receipt within the first set of wire lead receptacles.

5. The kit according to claim 4, wherein the hanger bracket comprises canopy mounting tabs.

6. The kit according to claim 5, further comprising a canopy.

7. The kit according to claim 5, wherein the wire connector is carried by the mounting bracket.

8. The kit according to claim 3, further comprising a gasket for use between the mounting bracket and the structure.

9. The kit according to claim 8, wherein the gasket comprises a recess for receipt of the mounting bracket.

10. The kit of claim 1, wherein the mounting bracket further comprises a base in which the fastener openings are located and the base does not have an opening for passage of electrical wire leads from a household power supply.

11. The kit of claim 1, wherein the strain relief comprises a clamp that clamps against the electrical cord.

12. A ceiling fan mounting kit for a non-hard-wired electrical connection, the kit comprising:

a mounting bracket having fastener openings through which fasteners can pass to secure the mounting bracket to a structure;

an electrical cord having a plug on one end and a set of wire leads on another end;

a strain relief securing the electrical cord to the mounting bracket;

a wire connector carried by the mounting bracket and receiving the set of wire leads from the electrical cord; and a hanger bracket having a hanger ball seat;

wherein the mounting bracket further comprises a peripheral wall with a cord notch through which the electrical cord passes;

wherein the strain relief is aligned with the cord notch; and wherein the wire leads are located interior of the peripheral wall and the plug is exterior of the peripheral wall.

13. The kit of claim 12, further comprising a gasket to seal the mounting bracket with the structure.

14. The kit of claim 13, wherein the gasket comprises a recess that receives at least a portion of the mounting bracket.

15. The kit of claim 14, wherein the gasket and the mounting bracket have complementary planar surfaces.

16. The kit of claim 15, wherein the complementary planar surfaces have complementary fastener openings.

17. The kit of claim 16, wherein the gasket has a peripheral wall complementary to the peripheral wall of the mounting bracket.

18. The kit of claim 17, wherein the peripheral wall of the mounting bracket is radially interior of the peripheral wall of the gasket.

19. The kit of claim 18, wherein the complementary peripheral walls are in contact.

20. The kit of claim 12, wherein the mounting bracket further comprises a base in which the fastener openings are located and the base does not have an opening for passage of electrical wire leads from a household power supply.

21. The kit of claim 12, wherein the strain relief comprises a clamp that clamps against the electrical cord.

* * * * *